United States Patent [19]
Tin

[11] 4,280,153
[45] Jul. 21, 1981

[54] DIGITALLY CONTROLLED AUTOMATIC BIAS CIRCUIT FOR MAGNETIC RECORDING

[75] Inventor: Lucas K. Tin, Redwood City, Calif.

[73] Assignee: Ampex Corporation, Redwood City, Calif.

[21] Appl. No.: 90,137

[22] Filed: Nov. 1, 1979

[51] Int. Cl.³ ............................................... G11B 5/47
[52] U.S. Cl. ..................................................... 360/66
[58] Field of Search .............................. 360/66, 31, 65

[56] References Cited

U.S. PATENT DOCUMENTS

| | | | |
|---|---|---|---|
| 4,011,585 | 3/1977 | Sunaga | 360/25 |
| 4,038,692 | 7/1977 | Umeda et al. | 360/66 |
| 4,092,678 | 5/1978 | Nishikawa | 360/31 |

*Primary Examiner*—Vincent P. Canney
*Attorney, Agent, or Firm*—Robert G. Clay; Elizabeth E. Strnad

[57] ABSTRACT

A digital circuit for generating a linearly increasing signal is provided for controlling the level of a recording A. C. bias signal. The digitally controlled bias signal is mixed with an analog signal of a known frequency and constant level and recorded. The circuit detects and stores a recording bias level corresponding to a reproduce signal envelope level, equal to an obtained peak level adjusted with respect to a known overbias level. The circuit compensates the detected recording bias level with respect to distance between the recording and reproducing heads to obtain an optimum recording bias level. The detected bias level remains stored and unchanged during power supply interruption.

15 Claims, 9 Drawing Figures

FIG_1

FIG_2a

FIG. 2b

FIG_2e

FIG_3

FIG_4

FIG_5

DIGITALLY CONTROLLED AUTOMATIC BIAS CIRCUIT FOR MAGNETIC RECORDING

BACKGROUND OF THE INVENTION

The invention relates to a digitally controlled circuit for automatically detecting an optimum A. C. recording bias signal level and storing that level in a memory device.

Magnetic recording/reproducing systems utilizing A. C. bias recording, for example, wideband audio tape recorders, require utilization of a precisely set optimum bias level for high quality recording. A recording technique known as overbiasing is commonly utilized to achieve the foregoing by obtaining a wide, flat frequency response characteristic and low harmonic distortion. For best quality of recording, tape manufacturers usually recommend a predetermined amount of overbias to be used with each type of magnetic tape. However, recording and playback characteristics differ with respect to various recording tapes and sometimes even when utilizing different batches of the same type of tape due to fluctuations in the magnetic characteristics of the particular transducer and tape utilized. Consequently, if optimum wideband recording characteristics are to be obtained, it is necessary to determine the exact amount of optimum recording bias level for each individual transducer and reel of tape, prior to recording.

In the past, an optimum bias signal level was known to be detected and manually set for each reel of tape prior to recording. The above method included manually increasing the amplitude of a bias signal having a predetermined frequency by adjusting a number of trimming potentiometers. The bias signal level was then mixed with an analog signal of known frequency and constant level and subsequently recorded. The resulting recorded signal was played back and a corresponding change in the output signal envelope obtained from the reproduce circuit was monitored. The maximum playback signal was first detected, then the recording bias level was further increased until the playback signal dropped to obtain a suggested overbias level and the resulting recording bias level was utilized for subsequent recording. Such manual method required operator skill, was time consuming, and, thus, costly.

There are also known prior art circuits as described, for example, in U.S. Pat. No. 4,011,585, which provide the above-described operations automatically by increasing the recording bias signal level. The corresponding reproduce signal is applied to both an envelope detector and a peak detector and the output of the peak detector is attenuated. When the obtained reproduce signal envelope level equals to the attenuated peak level, the operation is stopped and the corresponding recording bias level is detected by the circuit for use in subsequent recording.

It is a significant disadvantage that the known prior art circuits do not compensate for the distance between the recording and reproducing head, thus introducing substantial inaccuracy in the detected recording bias level. Such inaccuracy occurs due to a change in the recording bias level occurring during the time necessary for a point on tape to pass from the record head to the reproduce head. Besides, in the prior art devices the bias level increase and control is provided utilizing analog devices, thus, further contributing to inaccuracy of the detected signal level relative to the optimum recording bias level. Moreover, the prior art circuits do not provide for storing the detected bias level during power supply interruption or loss nor do they provide a range of selectable overbias levels for various types of tape for automatic recording bias detection.

SUMMARY OF THE INVENTION

Accordingly, it is an object of the present invention to provide a digitally controlled automatic bias circuit which eliminates the above-indicated disadvantages of prior art circuits.

More specifically, it is an object of the invention to provide a digitally controlled automatic bias circuit for use in magnetic recorders/reproducers utilizing a moveable recording medium, which circuit provides compensation for the distance between the recording and reproducing heads.

It is another object of the invention to provide a digitally controlled automatic bias circuit providing a recording bias level automatically adjusted for a selected overbias level.

It is a further object of the invention to provide a digitally controlled automatic bias circuit which stores a detected recording bias level during power supply fluctuations and interruption.

It is still a further object of the present invention to provide an automatic bias circuit comprising means for automatically detecting a decreasing D. C. power supply and responsively switching to an alternative power supply.

Still, it is an object of the present invention to generate a linearly increasing digital signal corresponding to an increasing bias signal level until a desired reproduce level is obtained and storing a digital signal corresponding to the obtained reproduce signal level during power supply fluctuations or interruption.

BRIEF DESCRIPTION OF THE DRAWINGS

FIGS. 2a to 2d are consecutive parts of a detailed schematic diagram corresponding to the block diagram of FIG. 1.

FIG. 2e shows how FIGS. 2a to 2d are arranged together to form the detailed schematic diagram.

DESCRIPTION OF THE PREFERRED EMBODIMENTS

First, a preferred embodiment of the invention will be described with reference to the simplified block diagram of FIG. 1, utilized, for example, in an audio tape recorder/reproducer, followed by a description of the detailed schematic diagram of FIGS. 2a to 2d, corresponding to the block diagram of FIG. 1. To facilitate description, the block diagram is divided into the following sections: section 1000 for generating a linearly increasing digital signal representing the recording bias signal level and for converting that digital signal into an analog signal level; section 2000 for generating an analog audio signal of a known frequency and constant amplitude; section 3000 for detecting an optimum recording bias level corresponding to a selected overbias level; section 4000 for providing A. C. bias recording and reproducing of an analog audio signal on tape; and section 5000 for providing timing and control.

Generally, the automatic bias circuit of the invention may be utilized in any magnetic recording/reproducing device having A. C. bias recording, on a single channel, as well as on a multichannel magnetic medium, as it is well known in the art. In case the circuit of the invention is utilized in a multichannel audio tape recorder, the recording bias level may be detected for only one recording channel, provided the other channels will be utilized for recording on the same tape. In the latter case, such a recording channel, utilized for recording bias detection may be selected manually, by connecting the necessary input, output and control signals via conductors to the recording and reproducing circuit pertaining to the selected channel. Alternatively, such a recording channel may be selected utilizing an automatic test control circuit, which may provide the above-indicated connections automatically, as it is disclosed in a copending U.S. Pat. Application, Ser. No. 90,050, entitled "Test Control Circuit for Multichannel Apparatus Such as Tape Recorders and the Like", by Philip H. Sutterlin, filed on Oct. 31, 1979, Ser. No. 90,050, commonly assigned to Ampex Corporation.

Figure 1:
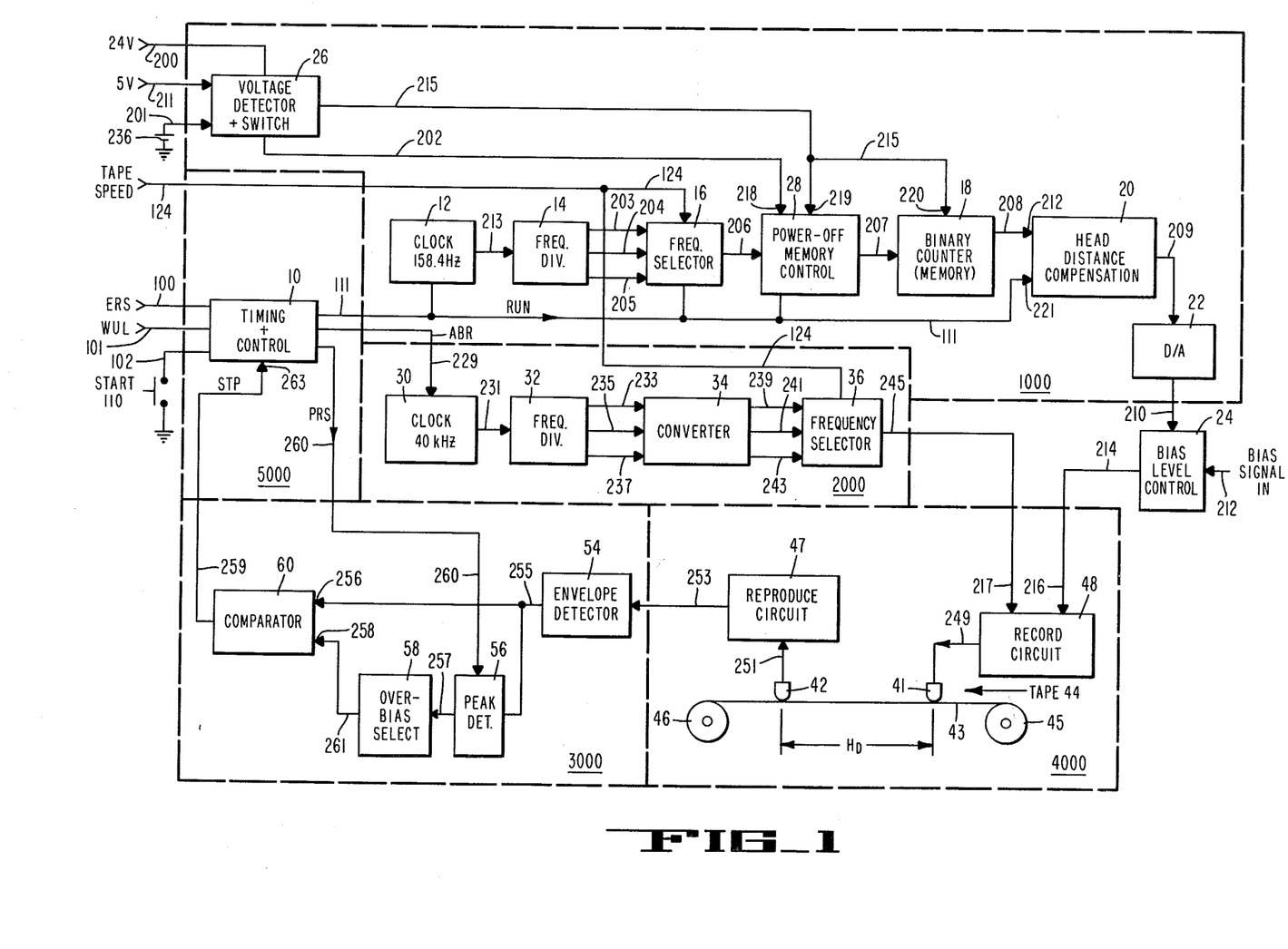
FIG. 1 is a block diagram of a digitally controlled automatic bias circuit in accordance with a preferred embodiment of the invention.

Referring now to FIG. 1, a clock signal generator 12, utilized in section 1000, provides on line 213 a basic clock signal frequency, selected as 158.4 bits/sec. The clock signal on line 213 is coupled to a frequency divider 14, which divides the above-indicated basic frequency by 4, 8 and 16, respectively, to obtain respective frequency divided clock signals of 39.6 bits/sec., 19.8 bits/sec., and 9.9 bits/sec., on lines 203, 204 and 205, respectively. These lines are coupled to respective separate inputs of a frequency selector 16. The frequency selector 16 receives a digital control signal on line 124, for example, from a logic circuit controlled by a tape speed select control button (not shown), which may be located on the control panel of the recording/reproducing device, as it is known in the art. Alternatively, in case a microprocessor is utilized to control various operations of the particular magnetic recorder/reproducer, such as described in the above-identified copending application, the latter signal on line 124 may be obtained from the central processing unit of such microprocessor in response to a selected tape speed, such as 30, 15 or 7½ inches per second (ips), as it is known in the art. The frequency selector 16 responsively selects one of its input signals on lines 203 to 205 as an output signal on line 206, which selected signal has a frequency corresponding to the selected tape speed, as follows: 39.6 bits/sec. corresponding to 30 ips; 19.8 bits/sec. corresponding to 15 ips; and 9.9 bits/sec. corresponding to 7½ ips. It follows from the foregoing description, that the selected frequency linearly increases with selected tape speed and the frequency-to-tape speed ratio remains constant for each selected tape speed. The output signal from frequency selector 16 on line 206 is applied as a clock signal via a power-off memory control circuit 28 and via line 207 to a binary counter 18. The binary counter 18 counts at the selected clock signal frequency received on line 207. The output signal from counter 18 on line 208 is an eight bit digital representation of the linearly increasing bias signal level at a selected tape speed, as it will follow from further description. In accordance with an important feature and advantage of the present invention, the above-indicated increasing bias signal level is further adjusted to compensate for the distance between the recording and reproducing heads, as it will be described later.

The binary counter 18 represents a memory which contains the digital representation of a particular bias level at any given time during the operation cycle of the automatic bias circuit of the invention, and which stores the digital representation of an obtained optimum bias level during recording mode provided by the particular tape recording device utilizing the automatic bias circuit.

In accordance with a further important feature of the invention, the power-off memory control circuit 28 is provided for preventing an erroneous operation and for preserving the contents of the binary counter 18, in case of excessive power fluctuation or loss of power supply during recording mode utilizing the recording bias level previously detected and stored by the circuit of the invention. The power-off memory circuit 28 is controlled by voltage detector and switch 26, via respective control lines 202 and 215, as follows. The circuit 26 detects a sudden voltage drop on line 200, supplying a 24 V unfiltered full wave rectified signal from the secondary of the system's main power transformer (not shown). When a sudden voltage drop on line 200 is detected, circuit 26 responsively applies a control signal on line 202 to a control input 218 of circuit 28 to inhibit operation of circuit 28 and, consequently, also of binary counter 18, to prevent unintentional change in the memory contents due to change in power supply, thus preventing faulty operation of the circuit of FIG. 1. Furthermore, the voltage detector and switch 26 detects a voltage drop on line 211, coupled to a logic 5 V D. C. power supply utilized for the system's integrated circuits, as known in the art. Circuit 26 responsively switches to a standby 4.8 V system memory back-up battery 236 on line 201. Circuit 26 thus supplies via line 215 the necessary D. C. power to both the binary counter 18 and power-off memory circuit 28 during power-off to maintain the memory contents. When power is restored, the recording operation is resumed, utiliziing the recording bias level stored in counter 18, as it will be described in more detail with respect to the schematic diagram of FIGS. 2a to 2d.

The previously mentioned output signal from binary counter 18 on line 208, which during the operation cycle of the circuit of FIG. 1 corresponds to a linearly increasing bias signal level, is received by a first input 212 of the head distance compensation circuit 20. At a second input 221, the compensation circuit 20 receives, via line 111, a compensation control signal of a known constant value, which in the preferred embodiment of FIG. 1 is selected as four binary bits. That compensation signal is utilized to provide the desired compensation of a detected bias level with respect to the distance between the record and reproduce heads, as follows.

During the operation cycle of the automatic bias circuit of FIG. 1, the compensation circuit 20 combines the respective signals received at its first and second input 212 and 221. The resulting sum of the respective input signals, provided on line 209, represents the previously mentioned linearly increasing bias level. In accordance with the teachings of the present invention, the basic frequency utilized for the bias level increase, and provided by the clock signal generator 12, which frequency in the preferred embodiment is, for example 158.4 bits/sec., is selected such that an integral number of basic clock pulses, for example four bits, represents the time interval T necessary for a point on the tape to travel from the record head 41 to the reproduce head 42. Consequently, the above-indicated basic frequency is determined from the known distance, for example $H_D = 3.029$ inches, between the heads 41 and 42 of the particular tape recorder/reproducer 4000 utilized and the known tape speed. As it has been mentioned above, the basic clock signal frequency at the output of the frequency selector 16 changes linearly with the selected tape speed in such a way that the resulting recording bias level increase remains constant during the time interval T at any selected tape speed of 30, 15 or $7\frac{1}{2}$ ips, as previously described.

As it will be disclosed in more detail following the description of the remaining sections of FIG. 1, after the desired recording bias level is detected by the circuit of FIG. 1, the above-indicated compensation signal on line 111, applied to input 221 of the compensation circuit 20, is subtracted from the detected signal to provide the above-mentioned head distance compensation.

With further reference to the block diagram of FIG. 1, the output signal on line 209 from compensation circuit 20 is applied to a digital-to-analog (further referred to as D/A) converter 22, as it is well known in the art. A resulting analog signal on line 210 from D/A converter 22 is applied to a bias level control circuit 24 for adjusting the level of the recording bias signal supplied via line 212 from the system's main clock oscillator circuit, as is well known in the art. The recording bias signal which, in the preferred embodiment is 324 kHz, and whose level is adjusted in accordance with the above disclosure, is applied via line 214 to first input 216 of a recording circuit 48 utilized in section 4000 of FIG. 1, as it is well known in the art.

Section 2000 for generating an audio signal of predetermined frequency and constant level comprises a clock signal generator 30 providing at output line 231 a basic audio signal frequency, which in the preferred embodiment is selected to 40 kHz. A frequency divider 32 coupled to output line 231 divides the basic audio signal frequency by 2, 4 and 8, respectively, to obtain respective frequency divided clock signals of 20, 10 and 5 kHz, respectively, on lines 233, 235 and 237, respectively. In accordance with the preferred embodiment, the obtained square wave clock signals are applied to a square wave-to-sine wave converter 34, represented by a resonant band pass filter circuit, for providing corresponding sine wave signals on output lines 239, 241 and 243, as it is known in the art. The latter lines are coupled to an audio frequency selector 36, controlled by the digital signal received on line 124, as previously mentioned, indicating a selected tape speed. Dependent on the selected tape speed, the frequency selector 36 responsively selects one of its input signals and applies it as its output signal on line 245. Thus, in the preferred embodiment of FIG. 1, the resulting output signal on line 245 of 20 kHz corresponds to a selected tape speed of 30 ips; 10 kHz to 15 ips, and 5 kHz to $7\frac{1}{2}$ ips. The thusly selected audio frequency signal from the frequency selector 36 is fed via line 245 to a second input 217 of the previously mentioned recording circuit 48. The latter circuit 48 combines the respective signals on its inputs 216, 217 for subsequent recording as well known.

The recording circuit 48 is utilized in section 4000, schematically representing an audio magnetic tape recording/reproducing circuit, such as is well known in the art. A magnetic tape 43 is shown as traveling at a constant selected speed of 30, 15, or $7\frac{1}{2}$ ips, between a supply reel 45 and a take-up reel 46. The combined and processed signal by the recording amplifier circuit 48, is applied via line 249 to the record head 41 and recorded on tape 43. The reproduce head 42, located in the direction of tape movement indicated by arrow 44, at distance $H_D$ from the recording head 41 as previously described, picks up the recorded information and applies it via line 251 to the reproduce amplifier circuit 47, as is well known in the art. The output signal from the reproduce circuit 47 is coupled via line 253 to an envelope detector 49 utilized in section 3000 for detecting an optimum bias level corresponding to a selected overbias level, as it will be described below.

Figure 3:
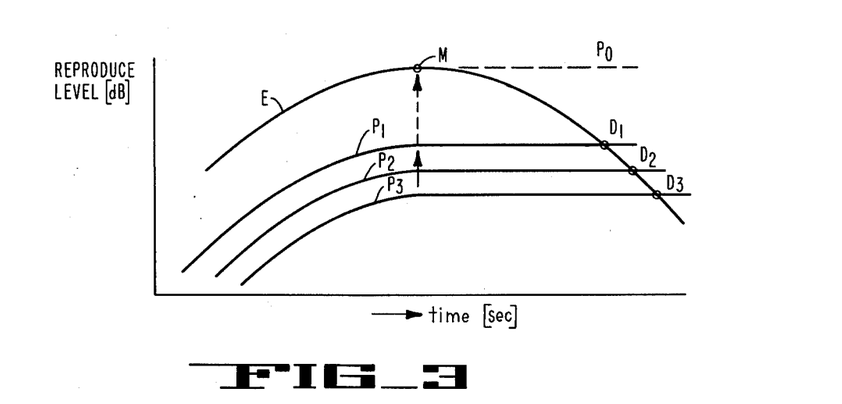
FIG. 3 is a graph representing examples of an envelope response characteristic and respectively attenuated peak response characteristics provided by the circuit of the preferred embodiment.

The envelope detector 54 of FIG. 1 receives the above mentioned playback signal on line 253 from reproduce circuit 47, in the form of an amplitude modulated signal, while the recording bias level increases, as previously described. The envelope detector 54, provides an output signal on line 255, corresponding to the D. C. level of the received amplitude modulated signal as is well known in the art. FIG. 3 shows an example of an envelope characteristic E obtained on line 255, from envelope detector 54. It is seen from FIG. 3 that graph E increases initially, it levels off at the peak level M and thereafter gradually decreases. The above-described signal E on line 255 is applied to a first input 256 of a signal level comparator 60 and, also, to a peak detector 56. As it is known in the art, the peak detector 56 detects the maximum amplitude value, or peak level, M, of signal E and retains that value. In the preferred embodiment of the invention the peak detector retains the detected value M until it is reset by a peak reset control signal PRS on line 260, as it will be described later in more detail. In FIG. 3 an output signal on line 257 from peak detector 56 is represented by a characteristic $P_0$ having a portion below the peak value M common with characteristic E, followed by a constant level portion indicated by an interrupted line. The above-described output signal from peak detector 56 on line 257 is applied to an overbias select circuit 58, provided in accordance with the present invention. The latter circuit 58 serves to reduce the obtained level characteristic $P_0$ by a predetermined overbias level such as specified (in dB) by the tape manufacturer for a particular type of tape utilized for recording. In accordance with the present invention, the overbias select circuit 58 is adjustable and, consequently, it is set to a specific overbias level as above indicated prior to the recording and it is reset for each different type of tape utilized.

As an example, in FIG. 3 various attenuated peak response characteristics $P_1$ to $P_3$ corresponding to various overbias levels adjusted by circuit 58 are shown, the overbias level increasing from $P_1$ to $P_3$. Provided characteristic $P_1$ corresponds to a specific recommended overbias level, then the resulting optimum recording bias level detected by the circuit of FIG. 1 is determined by a point of intersection, indicated as detection point D between the respective characteristics E and $P_1$. The thusly attenuated peak level on line 261 is applied to a second input 258 of signal level comparator 60. Comparator 60 applies an output signal STP on line 259 when the amplitudes of its respective input signals are equal, that is, when detection point $D_1$ is obtained. It will be understood that while a reproduce signal level is plotted in dB on the coordinate axis of FIG. 3, the abscissa may represent either time in seconds or recording bias level in dB, since the latter two parameters increase porportionally with respect to each other as previously disclosed.

The above-indicated output signal on line 259 from comparator 60 is applied to a control input 263 of the timing and control circuit 10 of section 5000, which circuit controls the operation of the above-described sections of the block diagram of FIG. 1 as follows. Circuit 10 is preferably implemented by digital logic circuits, as it will be described in more detail with respect to FIGS. 2a to 2d. To facilitate the description, various control and clock signals utilized in the preferred embodiment of FIGS. 1 and 2a to 2d are shown in the timing diagram of FIG. 5.

Referring now to both FIGS. 1 and 5, the operation of the timing and control circuit 10 will be described below. Circuit 10 receives a control signal ERS on line 100 provided, for example, by a logic circuit (not shown) controlled by the record circuit 48. Signal ERS is set low when the selected audio channel is in the recording mode. Another control signal WUL received by circuit 10 on line 101 is provided, for example, by a wake-up logic circuit (not shown), controlled by the power supply circuit. Signal WUL, as known to be utilized in complex digital circuitry, is set high only when the power supply to the tape recorder/reproducer has been turned on and when all power lines have the necessary respective voltages thereon. Alternatively, the respective control signals ERS, WUL may be obtained from the central processing unit of a microprocessor which may be utilized in combination with the recording/reproducing device as disclosed, for example, in the above-indicated copending patent application. For a more complete disclosure, examples of control signals ERS, WUL are shown in the timing diagram of FIG. 5 in the attached drawings.

To start the operation of the preferred embodiment of FIG. 1, a push button switch 110 is pressed to provide a START signal which is low on line 102. When all the signals ERS, WUL and START are in the above-indicated states, an operation cycle of the automatic bias circuit of FIG. 1 is initiated. In the preferred embodiment of FIG. 1, edge-triggered logic elements are utilized as shown in FIGS. 2a to 2d, and, also, as it is seen in the timing diagram of FIG. 5. Thus, for the respective control signals ERS, WUL and START it is necessary to acquire the above-specified respective states only during the time indicated by the unhatched portions of the timing diagram, the hatched portions indicating time when the above signals may have either one of the logic high or low values.

Upon receiving the above-indicated control signals on lines 100, 101 and 102, respectively, the timing and control circuit 10 applies a control signal RUN on line 111 to the respective previously described circuits 12, 16, 28, 20 and a control signal ABR on line 229 to circuit 30 of FIG. 1, respectively. As it is shown in FIG. 5, the RUN signal goes high after an initial delay of 89 milliseconds, as it will be disclosed in more detail with reference to the circuit diagram of FIGS. 2a to 2d. The RUN signal enables the clock signal generator 12 and the ABR signal enables the generator 30, respectively. As a result, generator 12 provides a clock signal CLK 1 of 158.4 Hz on line 213, and generator 30, a clock signal CLK 2 of 40 kHz on line 231, as it has been described previously.

The above-described RUN signal on line 111 also represents the previously mentioned compensation signal applied to the second input 221 of the head distance compensation circuit 20. As it has been described before, circuit 20 receives at its first input 212 an output signal from the binary counter 18 via line 208, representing the linearly increasing bias signal level. Circuit 20 combines the respective signals received at its inputs 212 and 221 by adding them together and the resulting output signal on line 209 therefrom corresponds to a resulting linearly increasing bias level applied to the D/A converter 22 as previously described.

As mentioned before, in the preferred embodiment of FIG. 1 the compensation signal on line 111 applied to second input 221 of circuit 20 is equal to four binary bits. The desired head distance compensation provided by the compensation circuit 20 will be described now with respect to the timing diagram of FIG. 5.

When the timing and control circuit 10 receives at its input 263 the previously mentioned control signal STP via line 259 from the comparator 60, it responsively changes the status of both the RUN signal on line 111 and the ABR signal on line 229, respectively. Consequently, circuits 12, 16, 28, 20 and 30, which are controlled by the latter signals, stop their respective operation. Since at the same time the RUN signal is removed from input 221 of compensation circuit 20, the output signal on line 209 from circuit 20 is responsively decreased by the previously described four binary bits, represented by the RUN signal, thus, compensating for the distance $H_D$ between the recording and reproducing heads, 41 and 42, as previously mentioned.

Figure 4:
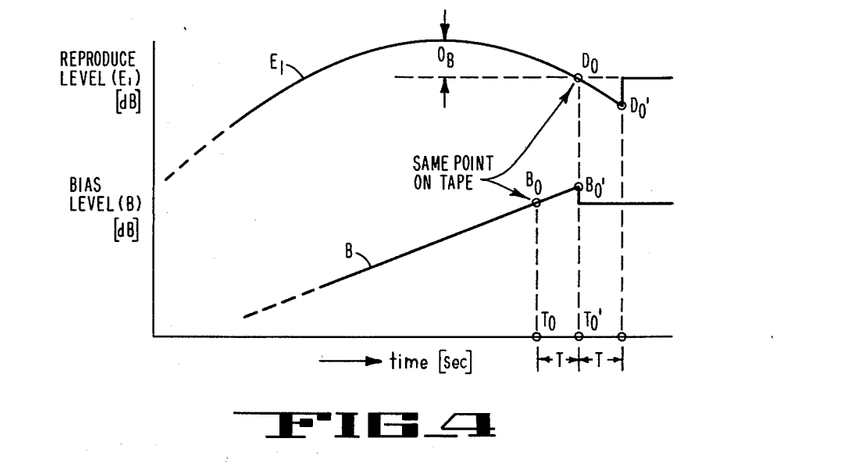
FIG. 4 is a graph representing examples of an envelope response characteristic and a recording bias level characteristic linearly increasing with time provided by the circuit of the preferred embodiment.

To further clarify the foregoing description, FIG. 4 shows graph B representing an example of a linearly increasing recording bias level with time, corresponding to a previously described output signal on line 210 from D/A converter 22. FIG. 4 also shows graph $E_1$, as an example, representing a playback signal envelope similar to graph E previously described and shown in FIG. 3. Graph $E_1$ corresponds to an output signal on line 255 from the envelope detector 54, as described previously with respect to graph E. In FIG. 4 a predetermined constant overbias level $O_B$ is shown, such as recommended by the tape manufacturer. The intersection of line $O_B$ with graph $E_1$ determines a detection point $D_O$, corresponding to point $D_1$ of FIG. 3. The time interval T indicated in FIG. 4 corresponds to a delay between recording an elementary information on tape by head 41 and reproducing the same information by head 42, located at a distance $H_D$ from head 41, as indicated in FIG. 1. It is seen from FIG. 5 that the time $T'_O$ of obtaining detection point $D_O$ is delayed by time interval T with respect to time $T_O$ of recording the desired optimum bias level $B_O$, corresponding to the detected level $D_O$. Thus, by the time $T'_O$, when the reproduced level $D_O$ is obtained at output line 255 from envelope detector 54, the recording bias level has increased to a level $B'_O$ which in turn corresponds to a decreased reproduced level $D'_O$. The difference between levels $D_O$ and $D'_O$ represents an error in the detection of the desired optimum recording bias level.

As it has been mentioned above, in the preferred embodiment of FIG. 1, the delay T corresponds to four clock pulses generated by the clock signal generator 12. When the detection point $D_O$ of FIG. 4, corresponding to the desired optimum recording bias level $B_O$ is obtained, the previously mentioned STP signal on line 259 is applied by comparator 60 to control input 263 of the timing and control circuit 10. The latter signal causes RUN signal on line 111 from circuit 10 to go low, as seen from FIG. 5. As previously mentioned, removal of the RUN signal at input 221 of the head distance compensation circuit 20 causes subtracting of four binary bits, that is, a binary value of 0010 from the eight bit binary output signal on line 209 from circuit 20. As previously described, the above-mentioned four bits correspond to the recording bias level increase $(B'_0-B_0)$ on line B during the time interval T due to non-zero head distance $H_D$. Consequently, subtraction of these four bits as above disclosed compensates for the above described error.

Returning now to FIG. 4, it is seen that after the detection point $D_0$ is obtained, the playback signal envelope E on line 255 continues to drop for a time T. When the RUN signal on line 111 in FIG. 1 becomes low and simultaneously the bias level signal on line 209 is decreased by the head distance compensation signal $(B'_0-B_0)$ as above described, the envelope level E on line 255 suddenly returns, that is, jerks back, to level D, which level corresponds to the desired optimum recording bias level $B_0$. The thusly compensated resulting optimum recording bias level $B_0$ is then retained in counter 18, serving as a memory, for use in subsequent recording, as described previously. The contents of counter 18 remain unchanged until a new cycle of the automatic bias circuit of FIG. 1 is started by applying control signals START, ERS and WUL to the timing and control circuit 10, as described previously, when the contents of counter 18 are cleared prior to resuming operation.

Following the detection and storing of the optimum recording bias level, the following operation is performed by the circuit of FIG. 1 to complete the autobias cycle and to prepare the circuit for a new operation cycle. With reference to FIG. 5, the STP signal on line 259 from comparator 60 causes the RUN signal on line 111 provided by timing and control circuit 10 change to low. Consequently, both generators 12 and 30 stop generation of the respective clock signals CLK 1 and CLK 2. As a result, the frequency divider 14, frequency selector 16, binary counter 18, frequency divider 32, converter 34, and frequency selector 36 also stop their respective operations. Consequently, the binary counter 18 stops counting and stores the last received digital value corresponding to the detected recording bias level, as previously described for use in subsequent recording. The STP control signal on line 259 also changes to low a PRS output signal on line 260 from the timing and control circuit 10, to clear the previously mentioned maximum reproduce signal level M which has been retained in the peak detector 56 during the preceding operation cycle, in preparation for a new cycle.

Figure 2A:
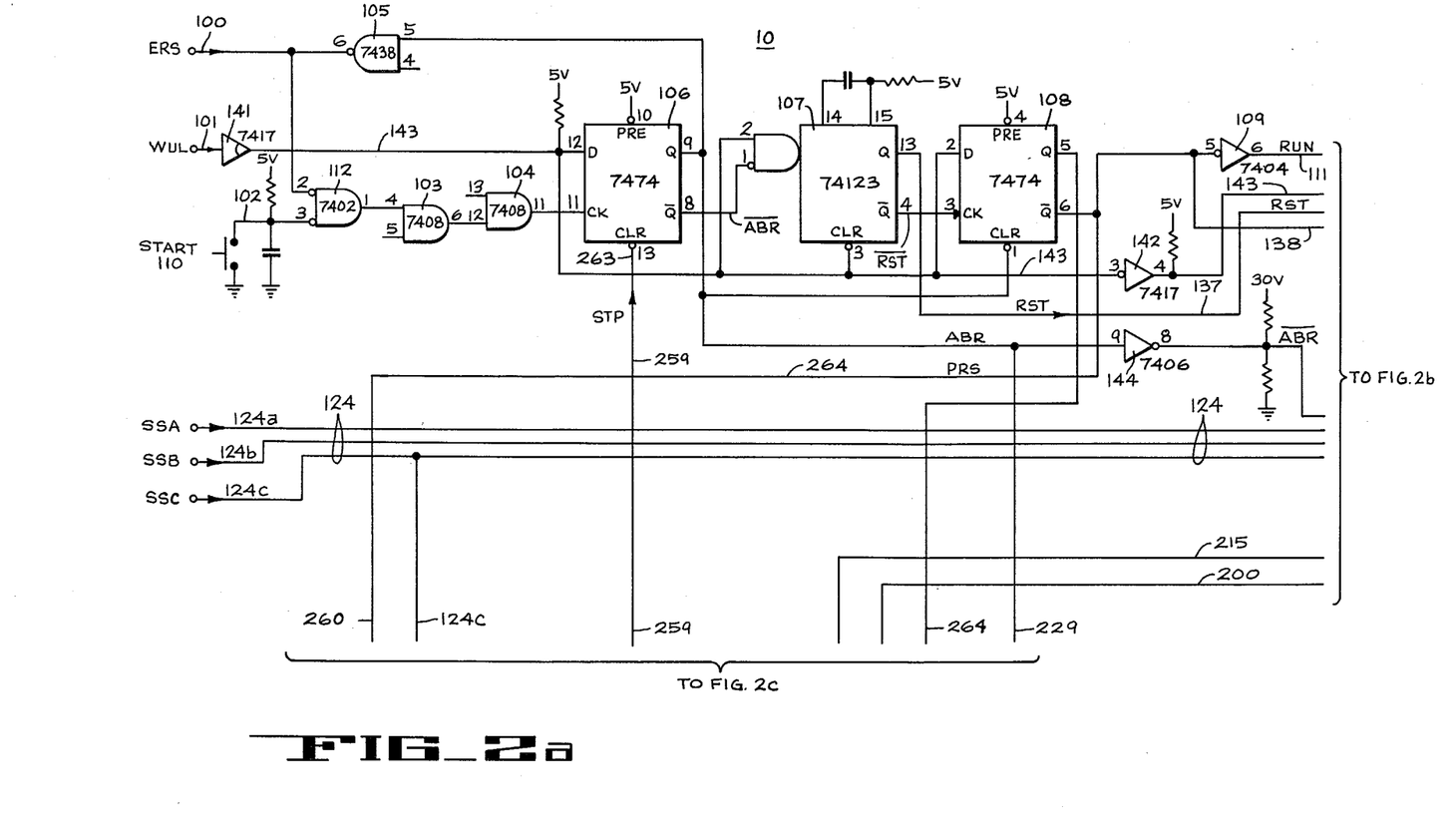

Now the detailed circuit diagram of the preferred embodiment shown in FIGS. 2a to 2d, corresponding to the block diagram of FIG. 1, will be described. Consecutive FIGS. 2a to 2d, are arranged as shown in FIG. 2e to represent the detailed diagram. To simplify the description and avoid repetition, corresponding blocks, circuits and elements of FIG. 1 and FIGS. 2a to 2d are designated by like reference numerals. It is noted that for complete disclosure of the invention, part numbers of conventional elements and circuits utilized as examples in the preferred embodiment are indicated in FIGS. 2a to 2d. Since, as mentioned before, the recording and reproducing section 4000 of FIG. 1 represents, as an example, well known elements, the latter section has been deleted from the detailed circuit diagram of FIGS. 2a to 2d.

Figure 2B:
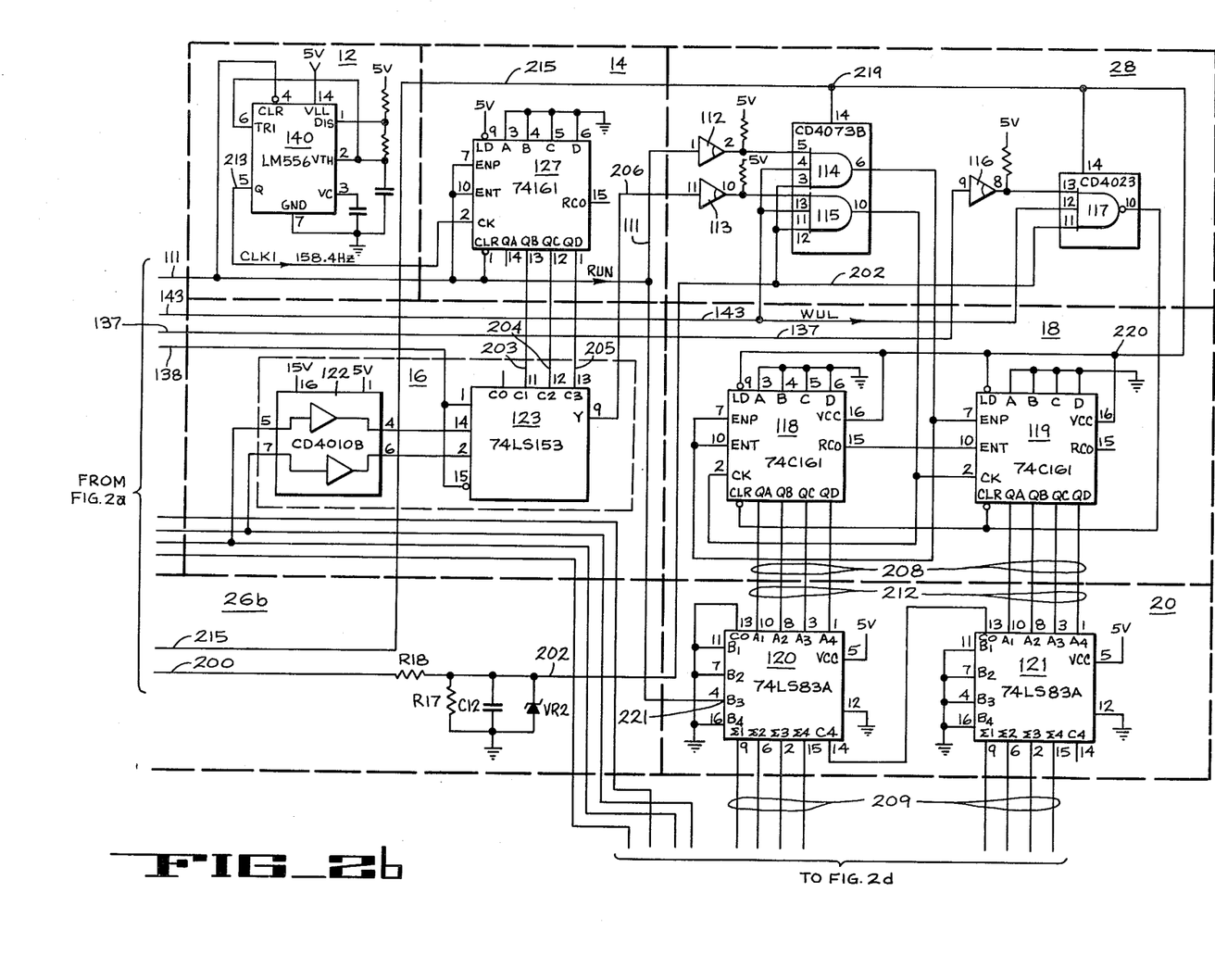
Figure 5:
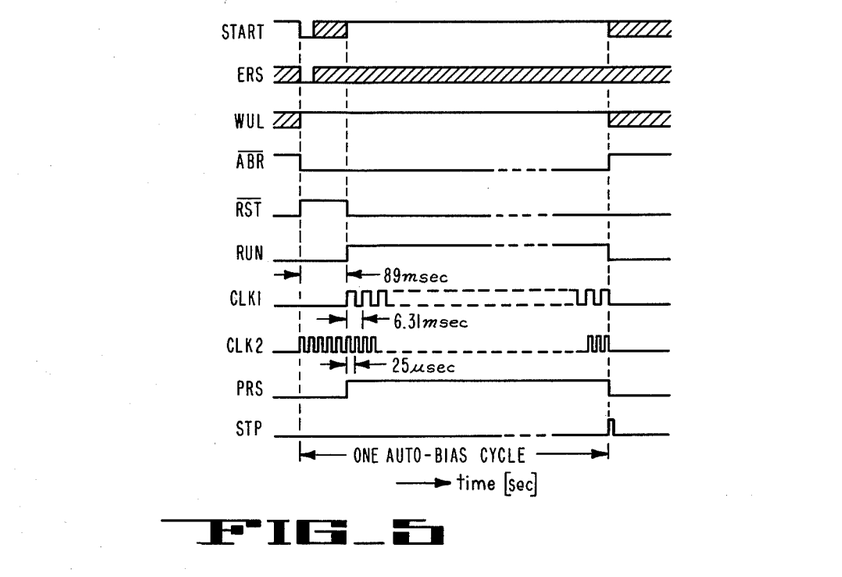
FIG. 5 is a timing diagram showing various control and clock signals necessary for operation of the preferred embodiment.

With reference to the timing and control circuit 10 shown in FIG. 2a, and the timing diagram of FIG. 5, the control signal ERS on line 100 is received by gate 112 and signal WUL is received on line 101 and applied via interface 141 to flip-flop 106. When signal ERS is low and WUL high, the operator presses push button switch 110 to apply START signal on line 102 to gate 112, to start the operation cycle of the automatic bias control circuit of FIGS. 2a to 2d. Consequently, gate 112 is enabled, its output goes high, causing Q output of flip-flop 106 to go high. Consequently, the output of gate 105 goes low, thus holding ERS signal on line 100 low to ensure that the selected audio channel is in the recording mode, as previously described. Consequently, the output signal $\overline{ABR}$ at $\overline{Q}$ output from flip-flop 106 triggers the one-shot multivibrator 107 which provides at its Q output a 89 millisecond pulse RST on line 137 for the purpose of resetting binary counters 118 and 119 and to allow the capacitor C18 of peak detector circuit 56, to be fully discharged, as it will be described later. Simultaneously, the $\overline{Q}$ output signal $\overline{RST}$ of one-shot 107 triggers D-type flip-flop 108 of control circuit 10, whose Q output via line 138 enables selector/multiplexer 123 of speed selector 16 of FIG. 2b. The $\overline{Q}$ output of flip-flop 108 is inverted via gate 109 of FIG. 2a and the resulting high signal RUN on line 111 clears, and subsequently enables oscillator 140 of clock generator 12 as shown in FIG. 2b. Simultaneously, the RUN signal on line 111 also enables binary counter 127 implementing frequency divider 14. The RUN signal is also applied via interface 112 to gate 114, of power-off memory control circuit 28. The RUN signal on line 111 applied to pin 4 of binary adder 120 in the head distance compensation circuit 20, represents a binary input signal of 0010, which, as is well known, corresponds to decimal number 4. The latter signal corresponds to the compensation signal previously described with reference to FIG. 1, applied to input 221 of circuit 20.

As it is seen from FIG. 2b, the clock signal generator 12 is implemented by a conventional oscillator circuit 140 and the frequency divider 14 is implemented by a binary counter 127. The oscillator 140 generates the previously described clock signal of 158.4 bits/sec. and applies it via line 213 to binary counter 127. The binary counter 127 divides the received clock signal by 4, 8 and 16, respectively, and it provides corresponding output signals of 39.6 bits/sec. on line 203; 19.8 bits/sec. on line 204; 9.9 bits/sec. on line 205, respectively. The above-indicated output signals on lines 203 to 205 are applied to a conventional demultiplexer 123 implementing frequency selector 16.

As it is shown in FIG. 2a, the previously described control signals SSA, SSB and SSC are received on lines 124a, 124b and 124c, respectively, corresponding to line 124 of FIG. 1. The latter lines represent the following respective combinations of high 15 V and low 0 V signals indicating the previously mentioned selected tape speeds: at 30 ips SSA is low, SSB and SSC are high; at 15 ips SSB is low, SSA and SSC are high and at 7½ ips SSC is low, SSA and SSB are high. The signals on lines 124a and 124b are received by respective input pins 5 and 7 of speed selector interface 122, implemented by a conventional circuit and utilized to reduce a 15 V input voltage on lines 124a and 124b to 5V output voltage, applied therefrom to demultiplexer 123.

The resulting output signal from pin 9 of frequency selector 123, which signal has been selected dependent on the particular tape speed, as described previously with reference to FIG. 1, is applied via line 206 and interface 113 to gate 115 of the power-off memory circuit 28. Gates 114, 115 and 117 of circuit 28 in FIG. 2b receive at their respective inputs signal WUL applied via respective interfaces 141, 142, of FIG. 2a, via line 143, as well as a control signal via line 202, provided by portion 26b of the voltage detector and switch 26, shown in FIG. 2b, whose operation will be described later. Since both these control signals on line 202 and 143 are high during normal operation, along with the signal on line 206, a resulting output signal from gate 115 is applied to the respective clock inputs at pins 2 of the respective eight bit binary counters 118, 119, implementing the binary counter circuit 18. Counter 118 is utilized for the four least significant bits (LSB) and counter 119 for the most significant bits (MSB) of the eight digit binary output signal provided on lines 208. The latter output signal on lines 208 is applied to a first input 212 of conventional four bit binary adders 120, 221 of the head distance compensation circuit 20. Adder 120 provided for the least significant bits and adder 121 provided for the most significant bits are interconnected in a conventional manner. As previously mentioned, the RUN signal on line 111 is applied to input pin 4 of adder 120, as representing four binary bits. The latter signal is utilized for compensation of the distance $H_D$ between the recording and reproducing heads 41 and 42 of the particular audio tape recorder utilized, as previously described.

The resulting eight bit digital output signal on lines 209 from the head distance compensation circuit 20, is the sum of the above-mentioned input signals. It represents a linearly increasing bias signal level, as previously described with reference to FIG. 1. The latter signal is applied to a conventional D/A converter 124 of circuit 22 shown in FIG. 2d. The output signal of D/A converter 124 obtained at pin 4 is in the form of an output current, whose magnitude represents the desired analog bias signal level. The latter signal is applied via line 210 to input pin 2 of an operational buffer amplifier 125, providing a necessary output voltage. Amplifier 125 is included in the bias level control circuit 24 for controlling the level of a conventional recording bias signal as follows. Circuit 24 comprises three FET transistor switches Q145 to Q147. Switch Q145 receives via line 212 a bias clock signal from the system's main clock circuit (not shown) which in the particular recorder/reproducer of the preferred embodiment is selected as 324 cycles/sec. During one-half clock cycle representing a high pulse the gate of switch Q145 is high and switch Q145 is closed. Consequently, the gate of switch Q146 connected to the drain of Q145 is low, thus, switch Q146 stays open. The gate of Q147 is also high, thus, switch Q147 is closed. During the low half clock cycle the above-indicated states of switches Q145 and Q147 are reversed, respectively. Consequently, the level of the clock signal pulses obtained at output 279 from interconnected switches Q146, Q147 is controlled by the input signal from amplifier 125. The resulting output signal from switches at 279 is filtered by L1, C39 and the filtered output signal at 214 from circuit 24 represents the bias signal of 324 cycles/sec., whose level is controlled by the automatic bias circuit of the present invention. The obtained square wave signal on line 214 is filtered by a known filter device (not shown) to obtain a sine wave signal for recording, as it is well known in the art.

Figure 2C:
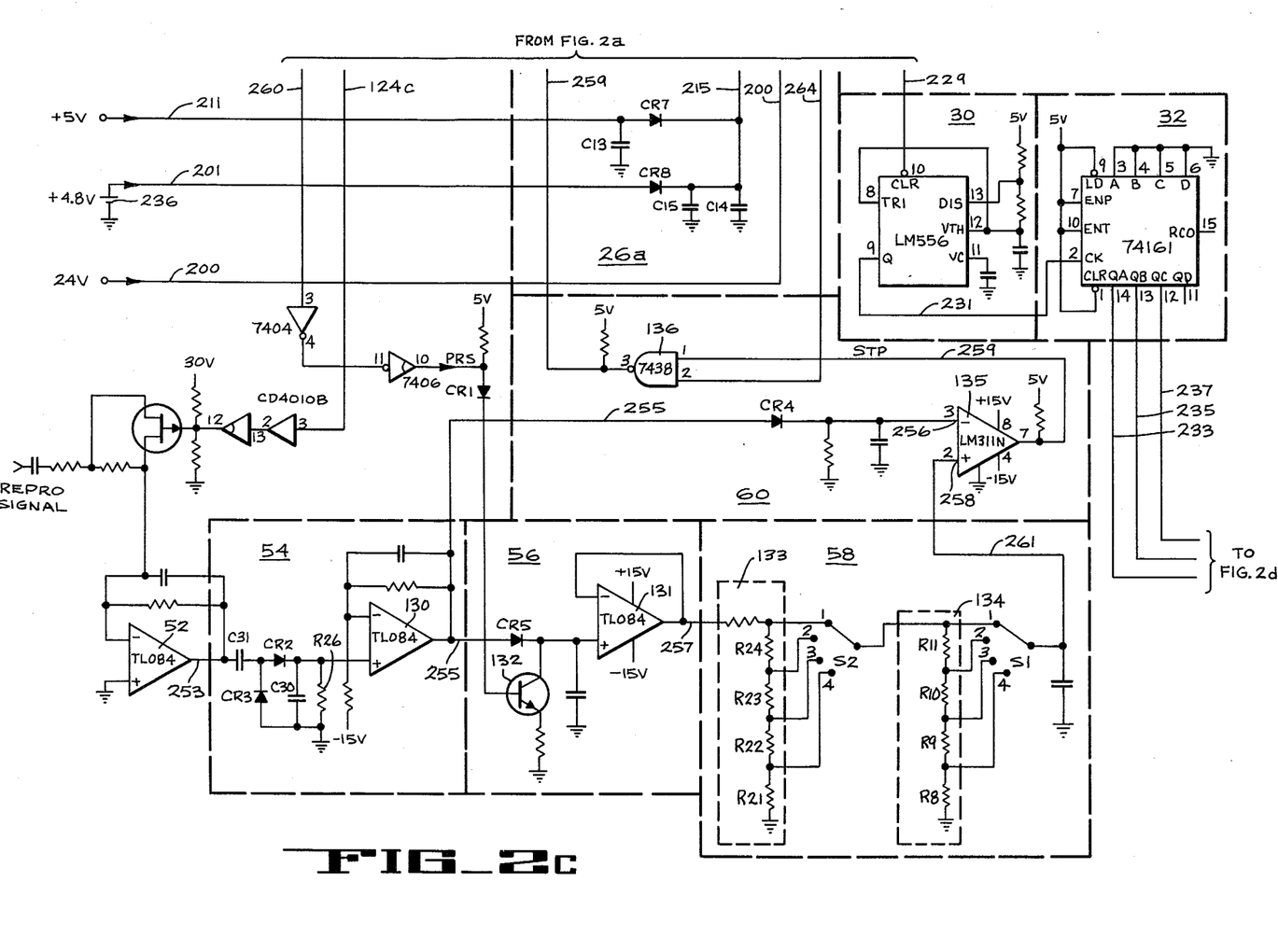

Referring now to FIG. 2c, the envelope detector 54 receives on line 253 an amplitude modulated reproduce signal from a conventional reproduce circuit 47, which signal corresponds to the previously described A.C. bias recorded signal, as it is well known in the art. An operational amplifier 52 shown in FIG. 2c is utilized in the reproduce circuit 47 to serve as a buffer amplifier to provide sufficient current and voltage swing to the envelope detector 54. The envelope detector 54 utilizes a filter implemented by capacitors C30, C31, resistor R26 and diodes CR2, CR3, to detect the input signal envelope, as is well known in the art. The filtered signal is buffered by the operational amplifier 130 of envelope detector 54. The output signal on line 255 therefrom represents the analog reproduce signal envelope, such as previously described and shown by graph E or $E_1$ in FIGS. 3 or 4, respectively. The thusly obtained output signal on line 255 is applied to a conventional peak detector 56, comprising a diode CR5, through which the signal from line 255 is applied to a noninverting input of operational amplifier 131. Storage capacitor C18 of the peak detector 56 serves to store the detected signal envelope received via line 255. The output signal on line 257 from operational amplifier 131 represents the previously described signal $P_0$ on line 257 provided by the peak detector 56 and shown in Fig. 3. The output signal on line 257 is applied to overbias select circuit 58. Transistor 132 connected across the terminals of storage capacitor C18 is utilized as a switch to discharge capacitor C18 and clear the signal corresponding to peak level M stored therein, prior to starting a new operation cycle by the circuit of FIGS. 2a to 2d, as mentioned previously. Switching transistor 132 is controlled by the previously mentioned signal PRS provided on line 260 by the control circuit 10, shown in FIG. 2a.

The overbias select circuit 58 comprises a voltage divider, having two sets of series resistors 133 and 134. The first set 133 comprises series resistors R21 to R25 whose one terminal is grounded and the other opposite terminal is coupled to line 257 receiving the output signal from the peak detector 56. The respective terminals from each resistor R21 to R25 are connected to separate contacts 1 to 4 of a first multi-contact switch $S_2$, whose common terminal is coupled to one terminal of the other set 134 of series resistors R8 to R11, the other opposite terminal of set 134 being grounded. Respective output terminals of each resistor R8 to R11 of set 134 are coupled to separate contacts of a second multi-contact switch $S_1$, whose common terminal provides the output line 261 of the overbias select circuit 58. The respective resistor values of the overbias select circuit 58 are selected such that contacts 1 to 4 of switch $S_2$ correspond to 1 dB; 2 dB; 3 dB; and 4 dB; attenuation, respectively, while contacts 1 to 4 of switch $S_1$ correspond to an additional 0 dB; 0.25 dB; 0.50 dB; and 0.75 dB, respectively. The above-described selection of a known overbias level by switches $S_1$ and $S_2$ in the preferred embodiment of the invention allows attenuation of a detected peak level automatically, for each different type of tape utilized for recording, thus, representing an important feature of the invention.

The signal level comparator 60 of FIG. 2c is implemented by a conventional voltage comparator 135, having an output 0 V the signal at the positive input 258 is lower than the signal at the negative input 256 and 5 V when the input signal levels are equal, and thereafter, when the signal at the positive input 258 remains higher than the signal at the negative input 256. Comparator 135 receives at its negative input 256 the output signal on line 255 from envelope detector 54 via diode CR4 and at its positive input 258 it receives the output signal from overbias select 58 via line 261. Thus, when the amplitude of the input voltage at 258 equals to or exceeds that at 256, comparator 60 provides a high level STP signal on line 259 and applies it via gate 136 to control input 263 of flip-flop 106 of the timing and control circuit 10 shown in FIG. 2a. As a result, signal ABR at Q output of flip-flop 106 changes to low. Consequently, the signal PRS on line 260 at $\overline{Q}$ output of flip-flop 108 changes to high, thus causing switching transistor 132 of peak detector circuit 56 in FIG. 2c to close and discharge storage capacitor C18, as previously mentioned. The signal on line 264 from the Q output of flip-flop 108 applied to gate 136 shown in FIG. 2c assures that the STP signal on line 259 will go through that gate only after capacitor C18 has been completely discharged. Consequently, signal RUN at output from gate 109 on line 111 changes to low and discontinues the operation of the respective circuits 12, 14, 16, 18 and 20 of FIG. 2b, as previously described.

Now the operation of both the voltage detector circuit 26 and power-off memory circuit 28 will be described with reference to the detailed schematic diagram of FIGS. 2a to 2d. As it has been previously mentioned, the above circuits are utilized to provide an important feature of the invention allowing to retain an optimum recording bias level obtained by the previously described operation of the digitally controlled automatic bias circuit, in case power supply to the circuit is shut off either intentionally or unintentionally. The voltage detector and switch 26 of FIG. 1 is represented in the detailed diagram by portion 26a, shown in FIG. 2c, and portion 26b, shown in FIG. 2b, respectively. The circuit portion 26a of FIG. 2c receives a D.C. voltage supply of +5 V on line 211 from a conventional power supply circuit as previously described. Capacitor C13 is utilized to filter the above-indicated +5 V. Another capacitors C14 and C15 are utilized to filter a +4.8 V voltage received on line 201 from a standby battery 236 which is independent from the above-indicated power supply circuit. When the power supply on line 211 falls below 4.8 V, the diode CR7 stops conducting because the voltage across it is lower than its voltage drop, and instead, diode CR8 connected to line 201 supplies the necessary voltage via line 215 to the respective AND gates 114, 115 and 117 utilized in the power off memory control circuit 28 at input 219, as well as to binary counters 118, 119 of counter circuit 18 at input 220. The substitute battery source of 4.8 V to which the circuit portion 26a has switched, supplies sufficient power to the above circuits for retaining and storing the detected recording bias level in the counters 118, 119, as described previously.

In addition, the circuit portion 26b of the voltage detector and switch 26, shown in FIG. 2b, receives the previously described 24 V power supply on line 200 as shown in FIG. 2a. Zenner diode VR2, utilized in the above-indicated circuit portion 26b is selected to have an output voltage of 4.7 V. Resistors R17 and R18 form a potential divider, to change the 24 V to a lower level, while Zenner diode VR2 keeps it to 4.7 V. Consequently, when the voltage on line 200 starts to fall, the voltage on output line 202 from circuit portion 26b starts to drop until it reaches a low level. As it is seen in FIG. 2b, line 202 is coupled to respective inputs of AND gates 114, 115 and 117 of the power off memory control circuit 28. Thus, the respective output signals of these gates 114, 115 become low, and of gate 117 high, in turn discontinuing the clock signal via line 207 to the binary counters, which stop counting and the last count is stored therein, as previously described. The above-described operation prevents faulty operation due to excessive power supply fluctuations or loss of power, while preserving the detected recording bias level by the circuit of the invention for further use when power is turned on again.

It is noted, however, that latter operation will be caused also in case the control signal WUL received on line 101 is low, that is, when the power supply circuit has not yet reached steady state, since signal WUL is also applied via line 143 to gates 114, 115 and 117, as previously described. The above-described 24 V signal supplied on line 200 has been selected as a fast decreasing warning signal when loss of power occurs in the main power supply circuit since in the preferred embodiment, there are no capacitors on this particular voltage supply line which would retain the voltage after power loss.

The previously described clock signal generator 30 generating the audio signal of constant amplitude and frequency is shown in FIG. 2c as being implemented by a conventional oscillator circuit 270. The previously described clock signal of 40 kHz generated by oscillator 270 is applied via line 231 to binary counter 271, implementing the frequency divider 32 of FIG. 1. Oscillator 270 receives the previously described ABR control signal via line 229 from flip-flop 106 of the control and timing circuit 10 shown in FIG. 2a. The ABR signal enables oscillator 270 at the beginning of the automatic bias operation cycle. The binary counter 271 provides the previously mentioned respective output signals of 20; 10; and 5 kHz, respectively, on lines 233, 235 and 237, respectively, which signals are in turn applied to the square wave-to-sine wave converter 34 shown in FIG. 2d. In the preferred embodiment the latter filter is implemented by respective band pass filters indicated as 272, 274 and 276, each connected to one of the input lines 237, 235 and 233, respectively. As it is well known in the art, the latter filters are designed to have respective resonant frequencies corresponding to their respective digital input signal frequencies. Consequently, the respective signals on the output lines 239, 241 and 243 are sine wave signals of 20, 10 and 5 kHz, respectively. The frequency selector circuit 36, comprising FET transistors Q5 to Q9 utilized as switches, receives the above-indicated respective output signals from converter 34 on lines 239, 241 and 243. Switches Q5, Q8 and Q9 are respectively controlled by the signals SSA, SSB and SSC received on lines 124a, 124b and 124c as shown in FIG. 2a, which signals indicate the selected tape speed of 30, 15 and 7½ ips, respectively. The output signals of the respective switches Q5, Q8 and Q9 are coupled via series switches Q6 and Q7, commonly controlled by the above-described signal $\overline{ABR}$ from control circuit 10 of FIG. 2a. The resulting output signal on line 245 from the frequency selector circuit 36 is applied to a conventional audio signal amplifier 278, utilized in the record circuit 48, shown in FIG. 1, as it is well known in the art, and as it has been previously described with reference to FIG. 1.

While the invention has been particularly shown and described with reference to embodiments thereof, it will be appreciated that various alternatives and modifications may be made which will fall within the scope of the appended claims.

I claim:

1. An apparatus for automatically detecting an optimum A. C. bias signal level and storing that level in a memory device, for use in magnetic recording/reproducing systems, said apparatus receiving an A. C. bias signal of a known frequency, comprising in combination:

(a) a first means coupled to provide a digital signal linearly increasing at a known constant rate, said first means comprising a memory means;

(b) a second means coupled to convert said digital signal of said first means into an analog signal for controlling said received A.C. bias signal to have a linearly increasing level;

(c) a third means coupled to provide an analog signal of a known frequency and constant level;

(d) a fourth means coupled to receive and combine said A.C. bias signal controlled by said second means and said analog signal provided by said third means, and to record said combined signals on a movable recording medium;

(e) a fifth means coupled to provide a reproduce signal corresponding to said recorded signal;

(f) a sixth means coupled to said fifth means for detecting a maximum reproduce signal level attenuated by a predetermined amount of overbias; and (g) a seventh means coupled to said sixth means for responsively providing a control signal to stop operation of said first means and to store said digital signal provided by said first means in said memory means when said reproduce signal level is detected.

2. An apparatus for automatically detecting an optimum A.C. bias signal level and storing that level in a memory device, for use in magnetic recording/reproducing systems, said apparatus receiving an A.C. bias signal of a known frequency, comprising in combination:

(a) a first means coupled to provide a digital signal linearly increasing at a known constant rate, said first means comprising a memory means;

(b) a second means coupled to convert said digital signal of said first means into an analog signal for controlling said received A.C. bias signal to have a linearly increasing level;

(c) a third means coupled to provide an analog signal of a known frequency and consant level;

(d) a fourth means coupled to receive and combine said A.C. bias signal controlled by said second means and said analog signal provided by said third means, and to record said combined signals on a movable medium, said fourth means comprising a recording head;

(e) a fifth means coupled to provide a reproduce signal corresponding to said recorded signal, said fifth means comprising a reproduce head located at a known distance from said recording head;

(f) a sixth means coupled to said fifth means for detecting a maximum reproduce signal level attenuated by a predetermined amount of overbias;

(g) a seventh means coupled to said sixth means for responsively providing a control signal to stop operation of said first means and to store said digital signal provided by said first means in said memory means when said reproduce signal level is detected; and (h) an eighth means coupled to obtain said digital signal from said first means and said control signal from said seventh means for providing an output signal corresponding to said stored signal compensated with respect to said known distance between said recording and reproducing heads, to obtain an optimum recording bias signal level.

3. The apparatus of claim 2, wherein said first means comprises a clock signal generator whose frequency is selected to provide an integral number of clock pulses during a time representing a delay between recording and reproducing a particular information element with respect to said moveable magnetic medium and a particular recording/reproducing system utilized.

4. The apparatus of claim 3 wherein said first means further comprises a binary counter coupled to said clock signal generator for receiving said clock signal and providing said linearly increasing digital signal.

5. The apparatus of claim 4 wherein said seventh means is coupled to provide a compensation signal of a constant value representing said integral number of clock pulses, said eighth means is coupled to combine said digital signal provided by said first means and said compensation signal and said seventh means is controlled by said sixth means to stop providing said compensation signal when said reproduce signal level is detected, to obtain said compensated output signal provided by said eighth means.

6. The apparatus of claim 1, 2 or 3 further comprising a power-off voltage detector means coupled to detect a decreasing power supply voltage level and providing a second control signal coupled to prevent a change in said digital signal stored in said memory means, caused by said decreasing power supply voltage level.

7. The apparatus of claim 6 wherein said power-off voltage detector means is coupled to provide said second control signal to inhibit operation of said first means.

8. The apparatus of claim 6, further comprising a stand-by battery supply means and a switch means, and wherein said power-off voltage detector means is coupled to detect a predetermined voltage level drop in a D.C. power supply and responsively control said switch means to connect said stand-by battery supply to said memory means for supplying a power necessary to maintain said digital signal stored in said memory means during said voltage level drop.

9. The apparatus of claim 8 for use in a magnetic tape recorder providing a plurality of predetermined tape speeds, wherein said first means further comprises a frequency divider coupled to said clock signal generator for providing a plurality of respective divided clock signal frequencies proportional to said plurality of predetermined tape speeds, and a frequency selector for selecting one said divided clock signal frequency corresponding to a selected tape speed.

10. A digitally controlled apparatus for detecting and storing an optimum A.C. bias signal level for use in a magnetic recording/reproducing system, said apparatus receiving an A.C. bias signal of a known frequency, comprising in combination:

(a) a first digital signal generator (12) coupled to provide a first clock signal (on line 213) of a predetermined frequency;
(b) a binary counter (18) coupled to receive said clock signal from said first digital signal generator (12) and to provide a linearly increasing digital output signal (on line 208) having a rate of increase proportional to said first clock signal frequency;
(c) a digital-to-analog converter (22) coupled to receive said digital output signal (on line 208) from said binary counter (18) and to convert it to a linearly increasing analog signal (on line 210);
(d) a bias level control circuit (24) coupled to receive said A.C. bias signal of a known frequency (on line 212) and said linearly increasing analog signal (on line 210) for responsively controlling said A.C. bias signal to have a linearly increasing level (on line 214);
(e) a second digital signal generator (30) coupled to provide a second clock signal (on line 231) of a predetermined frequency;
(f) a square wave-to-sine wave converter (34) coupled to receive said second clock signal (on line 231) from said second digital signal generator (30) and to provide a corresponding sine wave signal (on line 245) having a constant level and a frequency proportional to said second clock signal;
(g) a magnetic signal recording circuit (48;41) coupled to receive and combine said sine wave signal (on line 245) and said controlled A.C. bias signal (on line 214) and to record said combined signals on a moveable recording medium (44);
(h) a magnetic signal reproducing circuit (47; 42) coupled to reproduce said recorded signal from said moveable recording medium (44);
(i) a signal detecting circuit (3000) coupled to receive a reproduce signal (on line 253) provided by said magnetic signal reproducing circuit (47; 42) and to provide a stop signal (on line 259) in response to obtaining a maximum reproduce signal level attenuated by a predetermined amount of overbias; and
(j) a timing and control circuit (10) coupled to receive said stop signal (on line 259) from said signal detecting circuit (3000) and to provide responsively a first control signal (on line 111), said first control signal being applied to said first digital signal generator (12; 30) to stop the operation thereof and to store said digital output signal provided by said binary counter (18) when said stop signal (on line 259) is obtained.

11. The apparatus of claim 10, wherein:
(a) said magnetic signal recording circuit (48; 41) comprises a recording head (41) and said magnetic signal reproducing circuit (47; 42) comprises a reproducing head (42) located at a known distance ($H_D$) from said recording head (41);
(b) said predetermined frequency provided by the first digital signal generator (12) is selected such that a time interval corresponding to passing an information element from said recording (41) to said reproducing head (42) is represented by an integral number of first clock signal cycles at a selected magnetic medium speed;
(c) said first control signal (on line 111) provided by said timing and control circuit (10) is a digital signal having a value corresponding to said integral number of first clock signal cycles;

(d) said apparatus further comprising a head distance compensation circuit (20) coupled between said binary counter (18) and digital-to-analog converter (22) to receive said digital output signal (on line 208) provided by said binary counter (18), said compensation circuit (20) further coupled to receive said first control signal (on line 111) provided by said timing and control circuit (10), and to combine said received signals, said combined signals (on line 209) being applied as a compensation digital output signal to said digital-to-analog converter (22) providing said linearly increasing analog signal and said timing and control circuit (10) coupled in response to said stop signal (on line 259) to discontinue application of said first control signal from said head distance compensation circuit (20) to compensate for said distance (Hd) between the recording and reproducing heads (41; 42).

12. The apparatus of claim 11, further comprising:
(a) a voltage detector (26) coupled to detect a power supply voltage level decrease (on line 200) and to provide responsively a second control signal (on line 202); and
(b) a power-off memory control circuit (28) coupled to receive said second control signal (on line 202) for responsively inhibiting further operation of said counter to prevent any change in said stored digital output signal due to said voltage level decrease.

13. The apparatus of claim 12, further comprising a stand-by battery (236), said voltage detector (26) being coupled to detect a predetermined drop in a D.C. power supply voltage level (on line 211) and to connect responsively said stand-by battery (236) to said power-off memory control circuit (28) and to said binary counter (18 via line 215) to supply a D.C. power necessary to preserve said stored digital output signal in said binary counter (18) during the voltage level decrease.

14. A digitally controlled apparatus for automatically detecting and storing an optimum recording A.C. bias signal level in a device for magnetic recording/reproducing of information signals with respect to a moveable medium, which device has a recording head and a reproducing head arranged at a known distance from each other, comprising in combination:
(a) a first means (12; 18) for providing a first digital signal (on line 208) linearly increasing at a known constant rate, said first means comprising a memory means (18);
(b) a second means (10) for providing a compensation and control digital signal (on line 111) having a constant value corresponding to a known increase of said first digital signal provided by the first means (12; 18) during a time interval representing a delay between recording and reproducing a particular information element with respect to said moveable medium (44);
(c) a third means (20) coupled to said first and second means, for receiving and combining said first digital signal and said compensation and control digital signal (on lines 208; 111) provided by said first and second means, respectively;
(d) a fourth means (22) coupled to said third means (20) for converting said combined digital signal (on line 209) into a corresponding analog signal (on line 210);
(e) a fifth means (24) coupled to receive an A.C. bias signal (on line 212) of a known frequency and said corresponding analog signal (on line 210) from said fourth means (22), for controlling said A.C. bias signal to have a level linearly increasing with said corresponding analog signal;

(f) a sixth means (30; 34) for providing a second digital signal of a known frequency (on line 231) and converting said second digital signal into a corresponding analog signal having a constant level and a frequency proportional to said known frequency (on line 245);

(g) a seventh means (48; 41) coupled to receive and combine respective output signals of said fifth and sixth means, and to record said combined signals on said moveable recording medium (44);

(h) an eighth means (47; 42) coupled to reproduce said recorded signal;

(i) A nineth means (54; 56; 58; 60) coupled to said eighth means for detecting a maximum reproduce signal level (on line 256) attenuated by a predetermined amount of overbias (on line 258), said nineth means responsively generating a stop signal (on line 259); and (j) said second means (10) coupled to receive said stop signal (on line 259) and responsively discontinuing application of said compensation and control digital signal (on line 111) to said third means (20), to stop said linearly increasing first digital signal provided by said first means (12; 18) and to store a last obtained value of said first digital signal in said memory means (18).

15. The apparatus of claim 14, wherein said first means (12; 18) comprises a clock signal generator means (12) having a frequency selected to provide an integral number of clock pulses during said time interval representing said delay between recording and reproducing a particular information element with respect to a particular selected speed of said moveable magnetic medium and wherein said compensation and control digital signal (on line 111) provided by said second means (10) is selected to correspond to said integral number of clock pulses.

* * * * *